March 10, 1936.  O. F. FREELAND  2,033,622
ELONGATION TESTING MACHINE
Filed Aug. 10, 1934   4 Sheets-Sheet 1
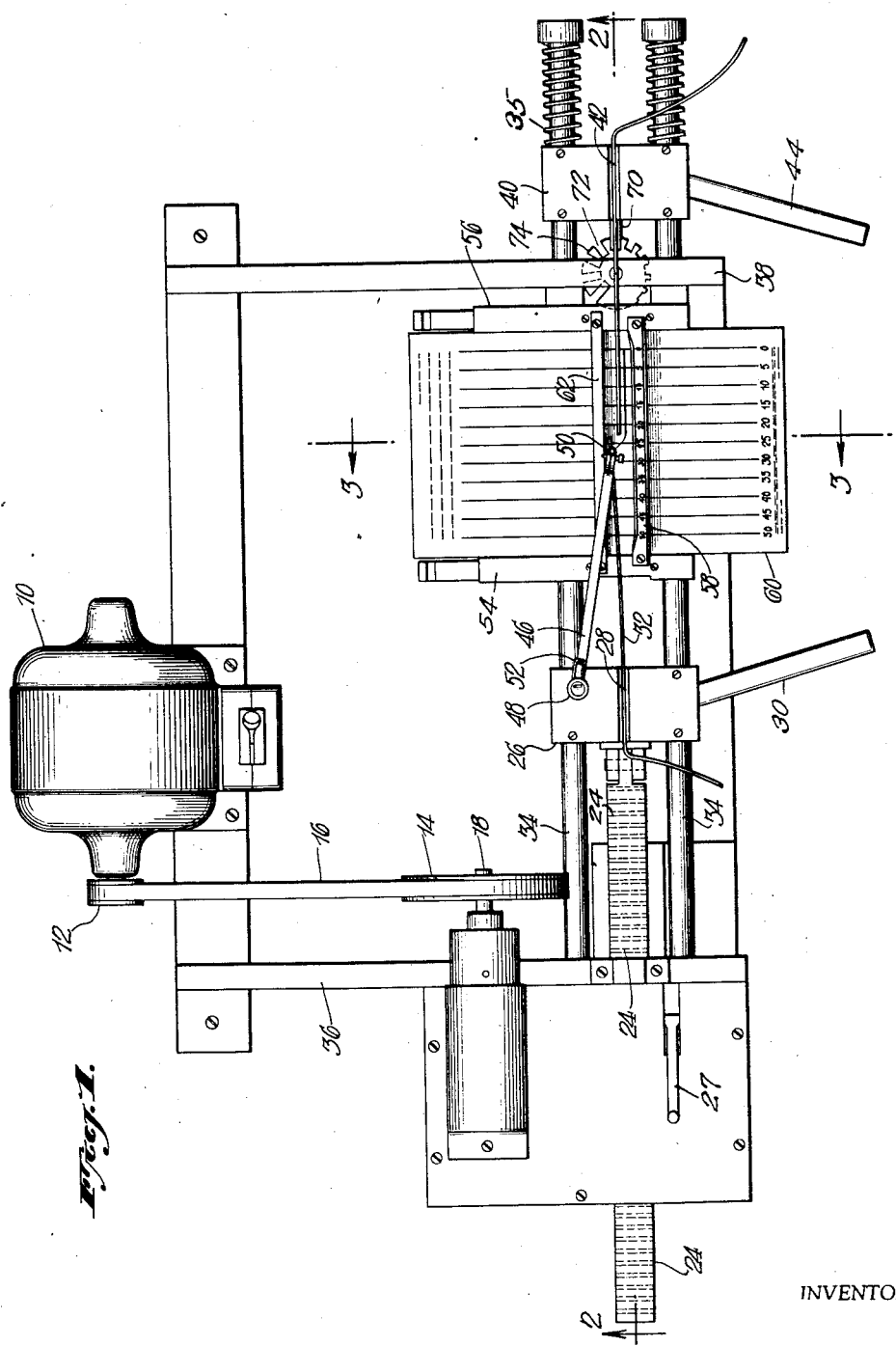
INVENTOR.
BY ORVILLE F. FREELAND.
ATTORNEYS March 10, 1936.  O. F. FREELAND  2,033,622
ELONGATION TESTING MACHINE
Filed Aug. 10, 1934  4 Sheets-Sheet 2
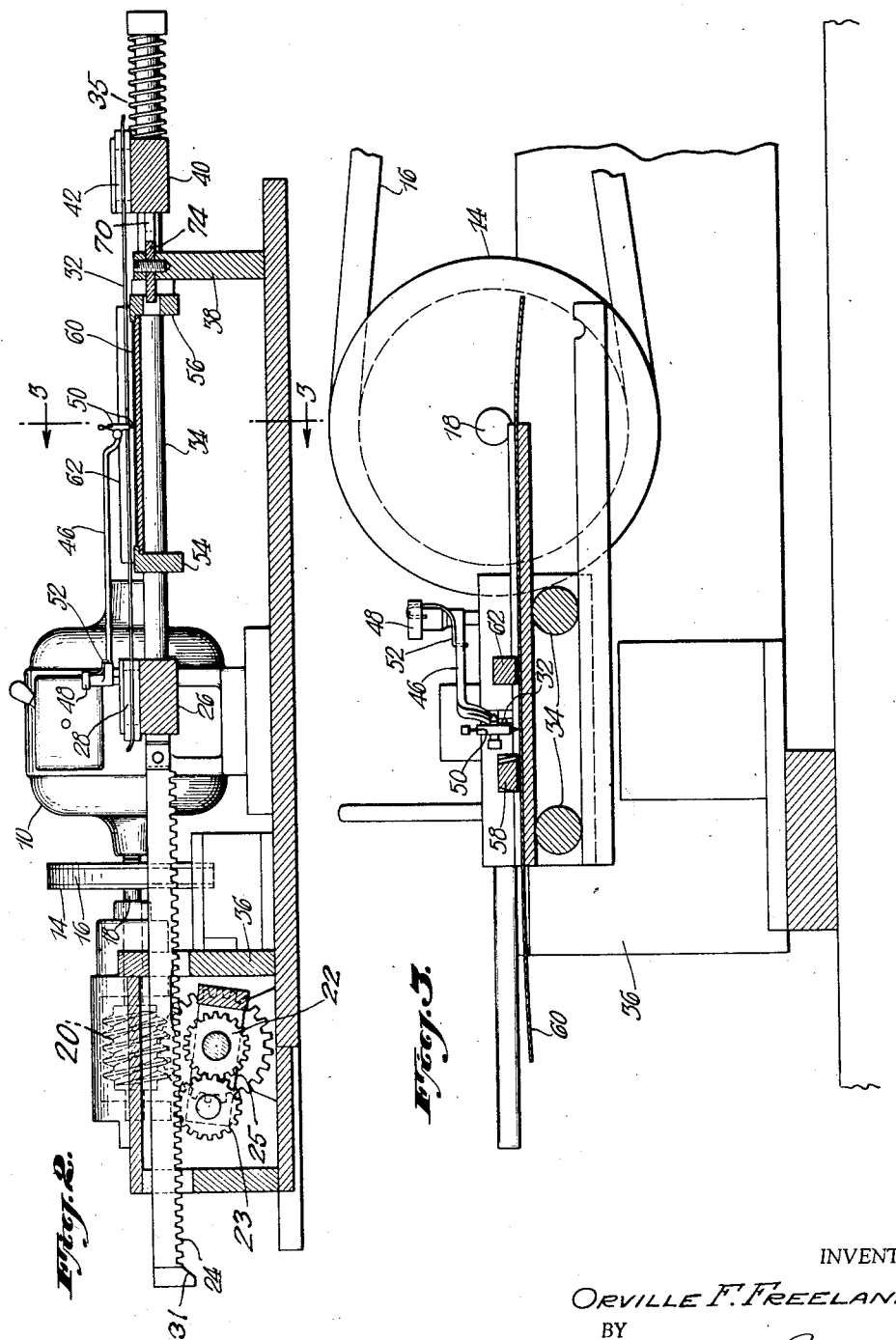
INVENTOR.
ORVILLE F. FREELAND.
BY
ATTORNEYS March 10, 1936. O. F. FREELAND 2,033,622
ELONGATION TESTING MACHINE
Filed Aug. 10, 1934   4 Sheets-Sheet 3
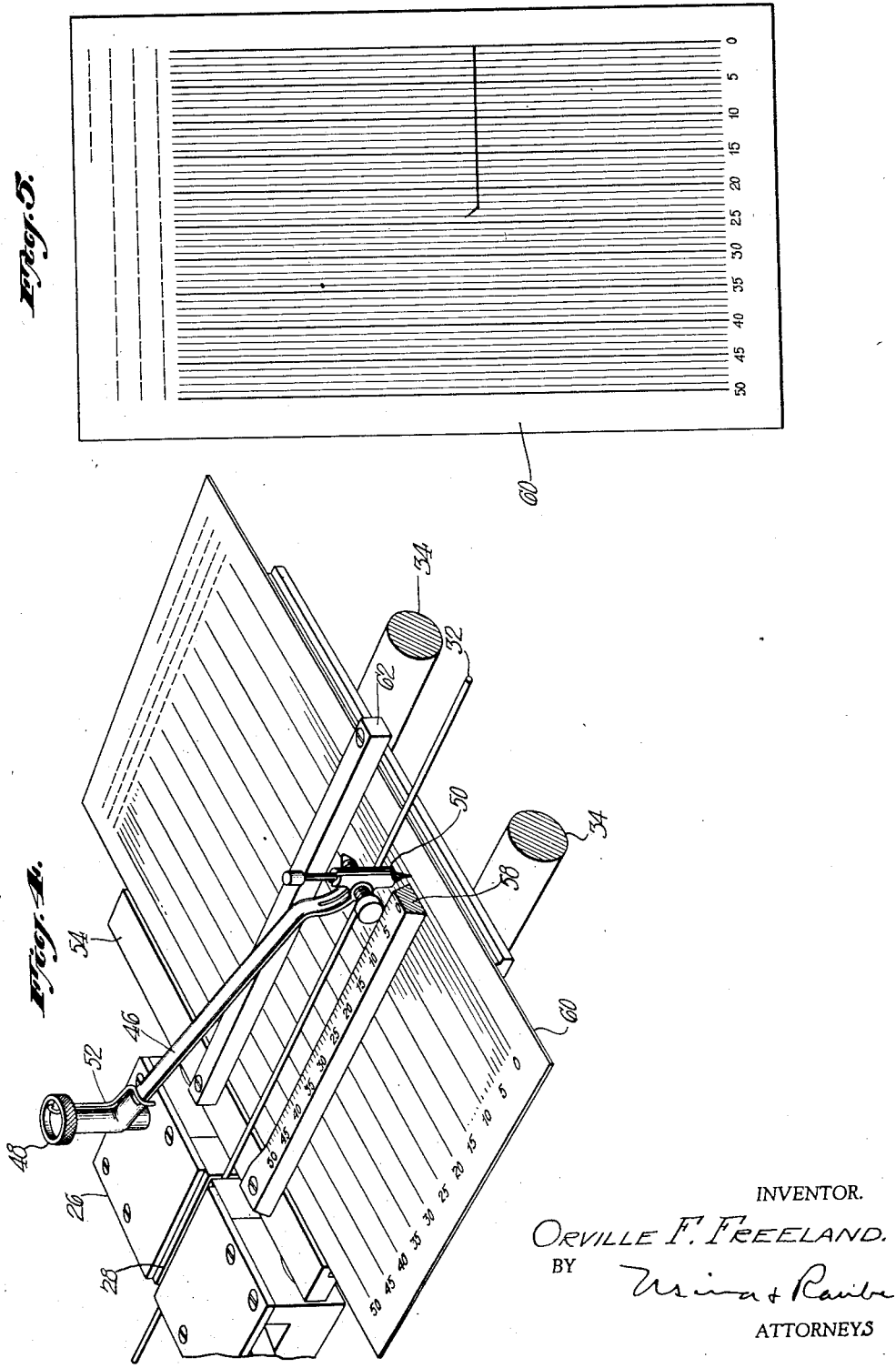
INVENTOR.
ORVILLE F. FREELAND.
BY
ATTORNEYS

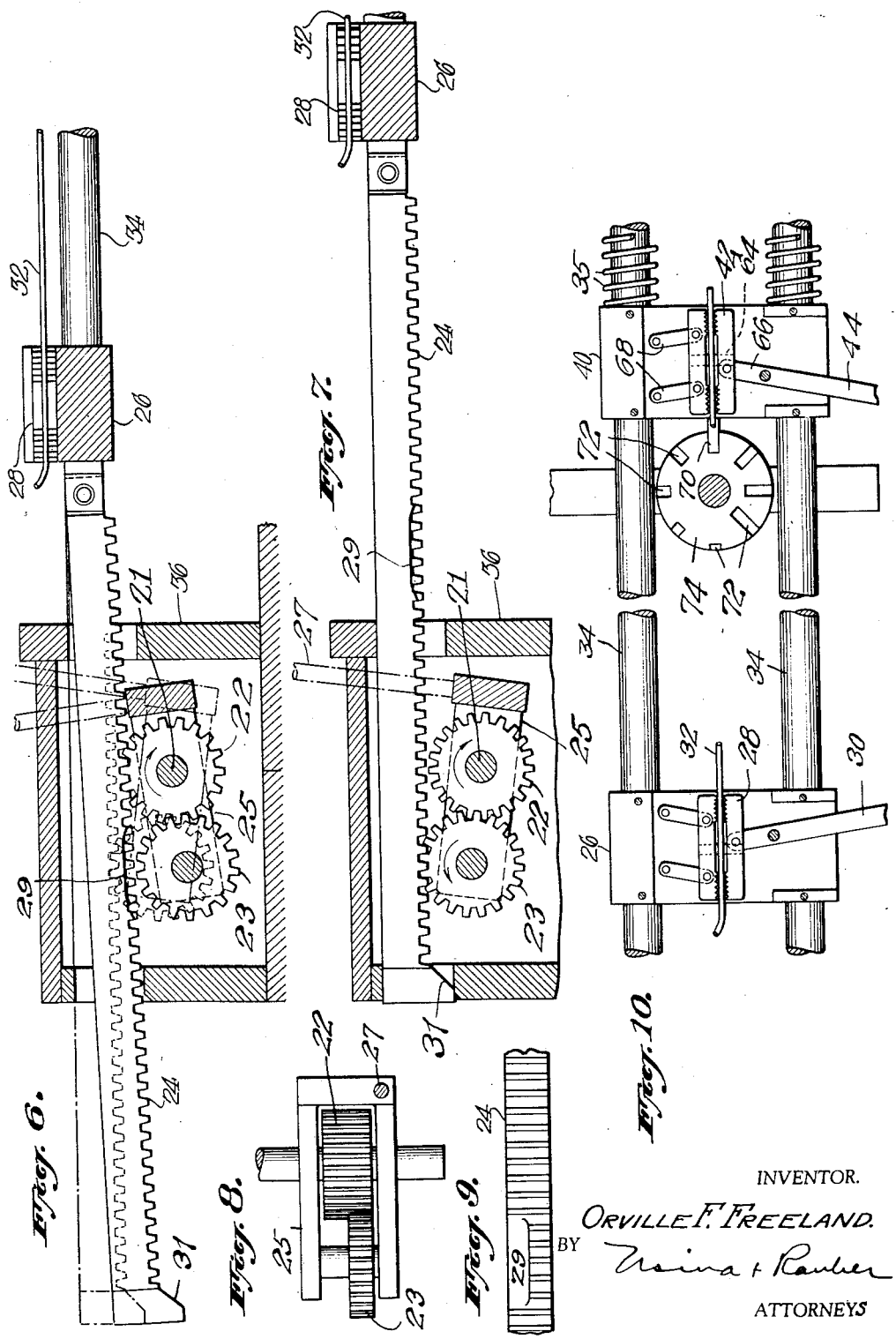

Patented Mar. 10, 1936

2,033,622

UNITED STATES PATENT OFFICE 2,033,622

ELONGATION TESTING MACHINE

Orville F. Freeland, Muskegon, Mich., assignor to Anaconda Wire & Cable Company, New York, N. Y., a corporation of Delaware Application August 10, 1934, Serial No. 739,212

6 Claims. (Cl. 234—1)

This invention relates to testing machines and aims to provide means whereby the elongation of the test piece can be graphically recorded and also means whereby the percentage of elongation required by a break test piece is also recorded.

While not limited thereto, the test apparatus of my invention is particularly adapted for testing copper wire. Heretofore, the human element has entered into the results of tests to such an extent that in many cases the accuracy of the tests were questioned because different operators making what were supposed to be the same tests have shown differing results. When testing wires manually, it has been found that some operators will apply the tension at a high rate of speed while others apply it slowly. This results in different test readings with inaccuracies varying from as much as two to three percent.

In order to eliminate the inaccuracies of prior testing machines, I provide power means for putting the test piece under tension and utilize a stylus which travels at a rate commensurate with the rate at which the piece on the test is elongated, such stylus being adapted to automatically move transversely when the test piece is fractured. The stylus rides on a record sheet and therefore makes a graph which accurately reproduces the movement of the tension element of the test machine and also records the point of break. Preferably, the graph is made on a blank ruled with sub-divisions calibrated as to percent of elongation of the piece under test. The foregoing as well as more detailed features of the invention will be fully apparent from the following specification when read in connection with the accompanying drawings, in which—

Fig. 1 is a plan view illustrating one embodiment of the invention; Fig. 2 is a longitudinal section on line 2—2 of Fig. 1; Fig. 3 is a transverse section on line 3—3 of Fig. 1; Fig. 4 is a perspective detail; Fig. 5 is a plan view of the record chart showing the graph delineated thereon by the stylus of the machine; Fig. 6 is an enlarged view in longitudinal section showing the reversible means for operating one of the clamp-holding members; Fig. 7 is a similar view showing the same parts in reverse position; Fig. 8 is a detail plan view of the gearing comprising part of the mechanism; Fig. 9 is a fragmentary inverted plan of the gear rack of Figs. 6 and 7 showing an interrupted portion thereof; Fig. 10 is an enlarged plan illustrating the clamp means and the arrangement for varying the clamping movement thereof to compensate for the different sizes of material to be handled.

Referring in detail to the drawings, 10 represents a motor which is adapted by means of pulleys 12 and 14 and belt 16 to transmit motion to a counter shaft 18 and through gearing, indicated generally at 20 to drive pinions 22 and 23, which are arranged to alternately mesh with a rack 24 hingedly mounted on a member 26. These pinions 22 and 23 are carried on a lever 25 which is mounted with freedom for a slight oscillating movement from the position of Fig. 6 to the position of Fig. 7 and vice versa the lever being pivoted on the shaft 21 which carries the pinion 22. Pressure on the manually operable control arm 27 will cause the pinion 23 to engage the teeth of the rack 24 and the driving force, which is transmitted through the pinion 22 tends to keep the pinion 23 engaged with the teeth of the rack until the rack is moved a sufficient distance to bring the interrupted portion 29 thereof into register with pinion 23. At this time, the same force will cause the pinion 23 to drop due to the lack of resistance by the rack and when the pinion 23 drops to the position of Fig. 6 it will automatically rock the lever 25 and thus mesh the pinion 22 to the rack. Inasmuch as the pinions 22 and 23 revolve in reverse directions, as indicated by the arrows, the reverse movement will be imparted to the rack. Thus, after each test, the mechanism shown and described is effective to return the parts to starting position for the next test.

At its left extremity, the rack carries a downwardly depending member formed with a cam surface 31, which functions to lift the rack from the position of Fig. 6 to the position of Fig. 7 when the limit of the right hand movement is reached, this cam surface coacting with any suitable part of the framework.

The rack 24 is adapted to reciprocate a test piece engaging member 26 which carries suitable clamp jaws 28 adapted to be actuated by a lever 30 in a manner hereinafter described, so as to clamp one end of the wire or other test piece 32. The member 26 is slidably supported on guide rods 34 secured to the frame members 36 and 38. A normally fixed test piece engaging member 40 is provided with clamp jaws 42, which are actuated by lever 44. The movable test piece engaging member 26 has pivotally supported thereon a stylus supporting element 46 and, as shown, its pivotal support includes a stud 48. A pen, pencil, or other suitable marking member, or stylus, as indicated at 50, is secured to the end of the element 46 and a spring 52 is provided which normally tends to press the stylus laterally against the work piece under test. As thus arranged, it is clear that when the work piece being tested is fractured a transverse mark will be made by the stylus.

Means are provided for supporting a record sheet in position for coaction with the stylus. As shown, these means include guide strips 54 and 56. These strips are bridged by a bar or scale 58 having marked sub-divisions thereon calibrated in percentages of elongation. The record sheet 60 is adapted to be passed under the bar 58 and also under a releasable hold-down bar 62. The test piece is positioned above the space defined by the scale 58 and bar 62 and when the piece breaks, the bar 62 limits the transverse deflection of the stylus carrying element 46. These members 58 and 62 also in cooperation with the strips 54 and 56 serve to prevent movement of the record sheet during the test.

As indicated in Fig. 5, the record sheet is ruled into sub-divisions so as to facilitate the reading of the percentage of elongation. While not limited thereto, the machine illustrated is adapted to handle test pieces ten inches in length. The transverse width between the lines numbered zero and fifty on the record sheet measures exactly five inches. Therefore, the ten larger sub-divisions ranging from zero to fifty represent five percent increments in percentage elongation and each of the smaller sub-divisions indicate one percent increments of elongation. In operation, when starting a test, the movable member 26 is moved to such position that the stylus will bear against the test piece and will be aligned with the zero line on the chart. The power is then applied by operating a suitable motor control switch. This causes the movable member 26 to move relatively to the fixed member 40, thus elongating the wire while the stylus is urged laterally thereagainst by the spring 52. When the limit of elongation of the piece under test is reached and the wire breaks, the stylus will be deflected under the influence of the spring and thus the graph delineated on the record sheet will give a reading of the percentage of elongation of the particular wire under test.

From the test indicated on the chart in Fig. 5, it will be noted that the graph is in the form of a straight line corresponding to the movement of the stylus lengthwise of the wire during the stretching thereof while under test and then there is a deflection from the straight line substantially at the sub-division corresponding to twenty three percent on the chart. Thus, this particular test piece withstood an elongating tension until it had been stretched a distance equal to twenty three percent of the ten inch piece being tested.

The jaws 28 and 42 clamping the opposite ends of the wire or other piece to be tested are preferably provided with means whereby their movement is controlled to correspond substantially with the diameter of the wire under test. The jaws are of substantially the same construction and a description of the right hand jaw shown in Fig. 10 will suffice for both. These jaws are movable toward and from one another, a transverse key piece 64 slidably engaging the two. One jaw member is pivotally secured to the short arm 66 of a lever 44 and the other jaw member is carried by a pair of parallel pivotally mounted links 68. Secured to the normally fixed member 40, there is a projection 70, which is adapted to engage in one of a plurality of notches 72 of different depths formed in the periphery of a rotatably mounted member 74. The member 40 is free to slide on the rods 34 and the springs 35 normally hold it in a desired one of several fixed positions controlled by the setting of the notched member. Thus, an exact distance can be maintained between the members 26 and 40, regardless of the gauge of wire being tested.

Opposite the various notches, there will be suitable markings corresponding to wire gauge or other desired designation. Such an arrangement is desirable in order to correctly position the parts before starting the test, and the link mounting for the jaws is desirable because the greater the pull exerted on the wire test piece the greater is the gripping action caused by the jaws.

While I have described quite precisely the details of the embodiment of the invention herein illustrated, it is not to be construed that I am limited thereto since various modifications and substitutions of equivalents may be made by those skilled in the art without departure from the invention as defined in the appended claims.

What I claim is:—

1. A testing machine comprising relatively movable test piece engaging members, a stylus, a supporting element therefor, means yieldingly urging said stylus transversely against the test piece so that when the test piece breaks, the stylus will instantly be moved across the gap caused by such breakage, a record sheet, and means for positioning said record sheet for coaction with said stylus.

2. A testing machine comprising relatively movable members having jaws for gripping a piece to be tested, means for moving one of said members relatively to the other, a stylus, an element supporting the stylus and carried by the movable one of said members, means normally tending to press the stylus transversely against the test piece and means for receiving the graphic record delineated by said stylus.

3. A recording elongation testing machine for wire and the like, comprising spaced members carrying means for securing the test piece, power means for moving one of said members relatively to the other in the direction of length of the test piece, a stylus, supporting means therefor carried by the movable one of said members, mark receiving means coacting with the stylus, means yieldingly urging said stylus and supporting means transversely toward the test piece whereby upon breakage of the test piece the stylus will make a mark on said mark receiving means transversely of the line of travel of said members.

4. A recording elongation testing machine for wire and the like, comprising spaced members carrying means for securing the test piece, power means for moving one of said members relatively to the other in the direction of length of the test piece, a stylus, normally riding against and yieldingly urged transversely of the test piece, and means for receiving the graph delineated by said stylus.

5. A recording elongation testing machine for wire and the like, comprising spaced members carrying means for securing the test piece, power means for moving one of said members relatively to the other in the direction of length of the test piece, a stylus, normally riding against and yieldingly urged transversely of the test piece and means for positioning a record sheet for coaction with said stylus.

6. A recording elongation testing machine for wire and the like comprising spaced members carrying means for securing the test piece, power means for moving one of said members relatively to the other, an arm pivotally mounted on the movable one of said members, a stylus carried by said arm and a spring normally urging the stylus transversely against the test piece, and a record sheet for coaction with said stylus.

ORVILLE F. FREELAND.